(12) United States Patent
Ciano et al.

(10) Patent No.: US 9,483,288 B2
(45) Date of Patent: Nov. 1, 2016

(54) METHOD AND SYSTEM FOR RUNNING A VIRTUAL APPLIANCE

(71) Applicant: INTERNATIONAL BUSINESS MACHINES CORPORATION, Armonk, NY (US)

(72) Inventors: Giuseppe Ciano, Rome (IT); Francesca Curzi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 14/048,660

(22) Filed: Oct. 8, 2013

(65) Prior Publication Data

US 2014/0143773 A1    May 22, 2014

(30) Foreign Application Priority Data

Nov. 21, 2012    (GB) .................................. 1220938.3

(51) Int. Cl.
*G06F 9/455* (2006.01)
*G06F 9/46* (2006.01)
*G06F 11/00* (2006.01)
*G06F 11/16* (2006.01)
*G06F 9/445* (2006.01)
(Continued)

(52) U.S. Cl.
CPC .............. *G06F 9/45533* (2013.01); *G06F 8/60* (2013.01); *G06F 9/5077* (2013.01); *G06F 11/3419* (2013.01); *G06F 11/3442* (2013.01); G06F 2009/45591 (2013.01); G06F 2201/815 (2013.01); G06F 2209/501 (2013.01); G06F 2209/508 (2013.01)

(58) Field of Classification Search
None
See application file for complete search history.

(56) References Cited

U.S. PATENT DOCUMENTS

2007/0079308 A1    4/2007 Chiaramonte et al.
2008/0080396 A1    4/2008 Meijer et al.
(Continued)

FOREIGN PATENT DOCUMENTS

CN    102521052 A    6/2012
WO    2011139281 A1    11/2011

OTHER PUBLICATIONS

A. Moskovsky et al., "Dynamic Resources Management of Virtual Appliances on a Computational Cluster", Springer, Euro-Par 2008 Workshops—Parallel Processing, Lecture Notes in Computer Science, 2009, vol. 5415/2009, pp. 33-42, (Abstract Only).
(Continued)

*Primary Examiner* — Lewis A Bullock, Jr.
*Assistant Examiner* — Melissa Alfred
(74) *Attorney, Agent, or Firm* — Law Office of Jim Boice

(57) ABSTRACT

A method, system, and/or computer program product runs a virtual appliance in a distributed computing system. One or more predefined parameters, indicative of respective operating characteristics of the virtual appliance while running, are monitored. Time dependent values of the one or more predefined parameters are collected during the monitoring time period. For each of the one or more predefined parameters, a metric value from the time-dependent values of the parameter is derived. The metric values are evaluated, based on the constraints. In response to a determination that at least one metric value is violating at least part of the constraints, a second set of resources is allocated to the virtual appliance and a second set of virtual machines are determined for deploying the virtual appliance, in order to satisfy the constraints.

18 Claims, 2 Drawing Sheets

(51) Int. Cl.
*G06F 11/34* (2006.01)
*G06F 9/50* (2006.01)

(56) References Cited

U.S. PATENT DOCUMENTS

| | | | |
|---|---|---|---|
| 2010/0306379 A1 | 12/2010 | Ferris | |
| 2011/0191781 A1 | 8/2011 | Karanam et al. | |
| 2011/0252137 A1 | 10/2011 | Stienhans et al. | |
| 2011/0307899 A1* | 12/2011 | Lee | G06F 9/5027 718/104 |
| 2012/0022910 A1 | 1/2012 | Chi et al. | |
| 2012/0096165 A1 | 4/2012 | Madduri et al. | |
| 2012/0144389 A1 | 6/2012 | Hicks et al. | |
| 2012/0166624 A1* | 6/2012 | Suit | G06F 9/5077 709/224 |

OTHER PUBLICATIONS

N. Bobroff et al., "Dynamic Placement of Virtual Machines for Managing SLA Violations", Integrated Network Management, 2007, IM'07, 10th IFIP/IEEE International Symposium on, pp. 119-128, (Abstract Only).

GB Patent Application No. GB1220938.3—Search Report Mailed May 10, 2013.

\* cited by examiner

METHOD AND SYSTEM FOR RUNNING A VIRTUAL APPLIANCE

This application is based on and claims the benefit of priority from United Kingdom (GB) Patent Application 1220938.3, filed on Nov. 21, 2012, and herein incorporated by reference in its entirety.

BACKGROUND

The present invention relates to the field of virtual environment systems, and more particularly to running a virtual appliance.

Cloud computing is the delivery of computing as a service, whereby shared resources, software, and information are provided to computers and other devices as a utility over a network (e.g. Internet).

Cloud computing may provide unlimited resources for users and applications but this can lead to an over-provisioning of the services provided by the Cloud and requested by the users.

SUMMARY

A method, system, and/or computer program product runs a virtual appliance in a distributed computing system. One or more predefined parameters, indicative of respective operating characteristics of the virtual appliance while running, are monitored. Time dependent values of the one or more predefined parameters are collected during the monitoring time period. For each of the one or more predefined parameters, a metric value from the time-dependent values of the parameter is derived. The metric values are evaluated, based on the constraints. In response to a determination that at least one metric value is violating at least part of the constraints, a second set of resources is allocated to the virtual appliance and a second set of virtual machines are determined for deploying the virtual appliance, in order to satisfy the constraints. The virtual appliance is deployed on the second set of the virtual machines, and the second set of resources is allocated to the virtual appliance for running the virtual appliance.

BRIEF DESCRIPTION OF THE SEVERAL VIEWS OF THE DRAWINGS

In the following, embodiments of the invention will be described in greater detail by way of example only making reference to the drawings in which.

DETAILED DESCRIPTION

Figure 1:
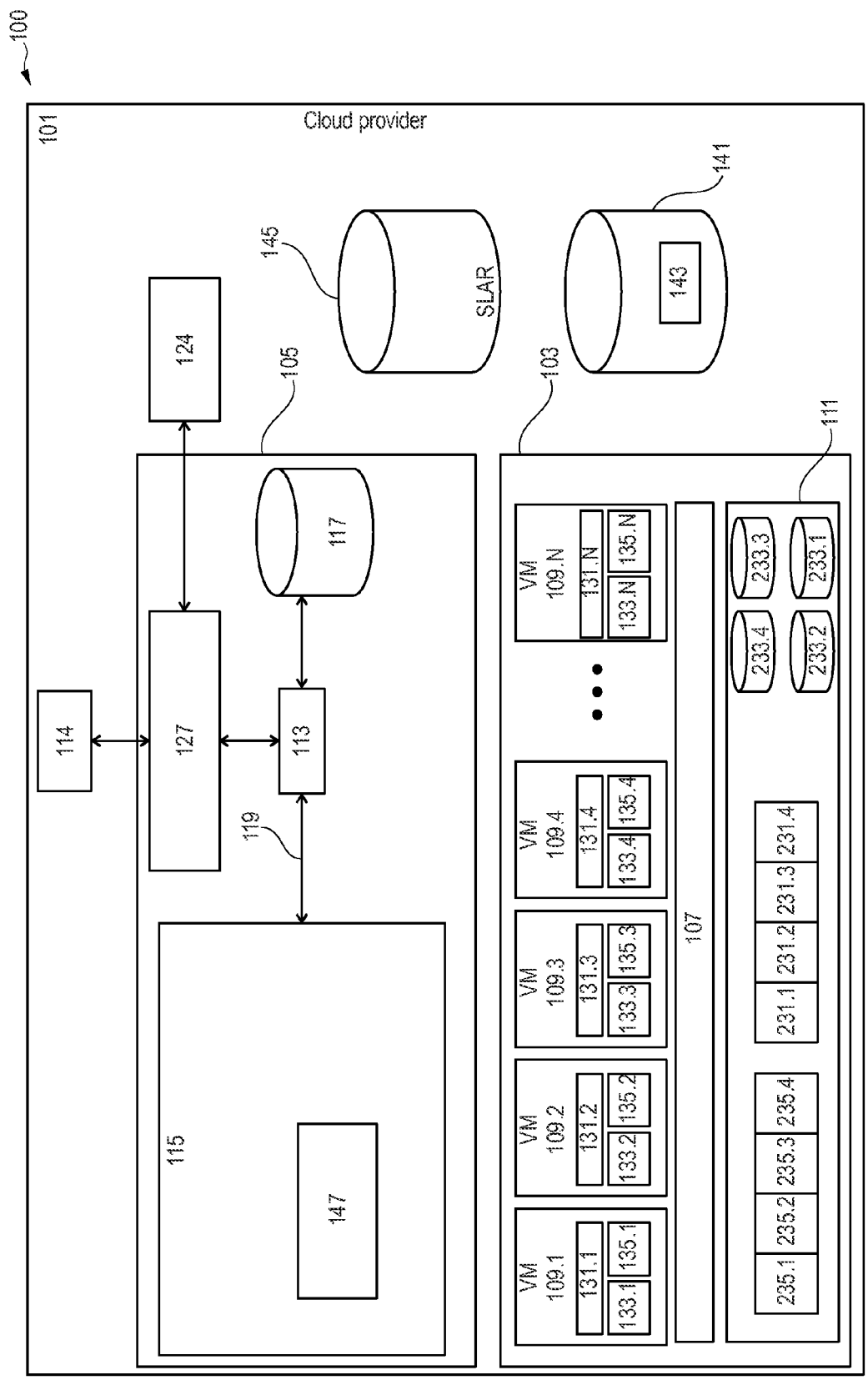
FIG. 1 illustrates system architecture for the execution of a method for running a virtual appliance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, like numbered elements in the figures either designate similar elements or designate elements that perform an equivalent function. Elements which have been discussed previously will not necessarily be discussed in later figures if the function is equivalent.

With reference now to the figures, FIG. 1 depicts a computing system 100 operable to execute a process for running a virtual appliance in a cloud computing environment. However, persons of ordinary skill in the art should appreciate that said process or the present subject matter may be executed in other distributed computing systems such as grid computing system and cluster computing systems and computing systems supporting virtualization software.

The computing system 100 comprises a cloud provider 101. The cloud provider 101 provides one or more physical machines 103 (only one is shown) and a computer server 105.

The physical machine 103 may comprise a hypervisor 107. The hypervisor 107 may create one or more virtual machines, for example, virtual machines 109.1-109.N. The hypervisor 107 may enable its virtual machines to share physical resources 111.

Each virtual machine (VM) comprises at least one virtual central processing unit (CPU) 131, at least one virtual disk 133, a virtual system memory 135, an operating system, and one or more applications running on the operating system. The components of the VM may be implemented in software to emulate the corresponding components of a physical computer.

The computer server 105 is shown in the form of a general-purpose computing device. The components of computer server 105 may include, but are not limited to, one or more processors or processing units 113, a computer memory 115, a computer storage 117 and a bus 119 that couples various system components including computer memory 121 to processor 113. The computer memory 105 is shown as containing a program utility 147 having a set of program modules that contain computer-executable code which enables the processor 113 to execute the steps 201-213 of FIG. 2.

Computer server 105 may also communicate with one or more external devices 114 such as a keyboard, a pointing device, a display 124, etc.; one or more devices that enable a user and/or an administrator of the computing system 100 to interact with computer server 105; and/or any devices (e.g., network card, modem, etc.) that enable computer server 105 to communicate with one or more other computing devices. Such communication may occur via I/O interface(s) 127. The computer server 105 may manage the hypervisor 107.

The computer server 105 is shown as a single device but it may also be implemented as a distributed system. This means distributing the modules of the utility 147 across several devices of the distributed computing system.

The computer server 105 may receive a virtual appliance from a user of the computing system 100 to be executed on the computing system 100. The virtual appliance may be packaged in a computer file. For example, the user may upload the virtual appliance file via the input device 114. The virtual appliance may comprise an application and a reduced operating system configured to support the application. The application may be a multi-tier architecture application such as a client server application comprising as many tiers as separate processes. For example, the multi-tier application may be a typical web application that may consist of three tiers: a web tier that implements a presentation tier, an application tier that implements the application processing, and a back-end database tier for data management.

The computer server 105 may distribute the application such that the presentation, application processing, and data management functions are logically separated. For that, the computer server 105 may deploy a first set of virtual machines for the virtual appliance. For example, the computer server 105 may deploy four virtual machines 109.1-109.4. For example, the virtual machine 109.1 may be associated with the presentation tier, the virtual machines 109.2 and 109.3 may be associated with the application tier and the virtual machine 109.4 may be associated with the database tier. The virtual machines 109.1-109.4 may be already created by the hypervisor 107. Alternatively, the computer server 105 may send a request to the hypervisor 107 to create the first set of virtual machines to be deployed for the virtual appliance.

The first set of virtual machines may be also associated with a first set of resources to be allocated for the virtual appliance. For example, the virtual machine 109.1 comprises a virtual system memory 135.1 which may be implemented in software emulating the corresponding physical memory 235.1 of the physical computer 103. The virtual CPU 131.2 of the virtual machine 109.2 is emulating the corresponding physical CPU 231.2 of the physical computer 103. The virtual CPU 131.3 of the virtual machine 109.3 is emulating the corresponding physical CPU 231.3 of the physical computer 103. The virtual disk 133.4 of the virtual machine 109.4 is emulating the corresponding physical disk 233.4 of the physical computer 103.

The physical resources 231, 233 and 235 form the first set of resources that are allocated to the virtual appliance.

The cloud provider 101 further comprises a meta-database 141. The meta-database 141 comprises deployment graph data 143. The deployment graph data 143 may be indicative of a deployment graph or a topology graph representing of the first set of the virtual machines 109.1-109.4. The deployment graph data may be indicative of the first set of virtual machines joined by edges indicatives of relationships between those virtual machines. Said relationships may depend on the multi-tier application distribution. For example, a relationship between the virtual machine 109.3 and 109.4 may be indicative of data being read from (or stored to) the virtual machine 109.4 by the virtual machine 109.3. The computer server 105 may determine and deploy the virtual appliance on the first set of virtual machines in accordance with the deployment graph.

While running the virtual appliance, the computer server 105 may monitor one or more predefined parameters indicative of respective one or more operating characteristics of the virtual appliance. For example, the one or more parameters may comprise CPU utilization, memory usage and network traffic used by the running virtual appliance. The one or more parameters may further comprise number of users using the virtual appliance. The monitoring may be performed during a monitoring time period. For that, the monitoring time period may be divided into N time intervals of equal time length. In another example, the time intervals may be of different time length.

The monitoring time period may be automatically determined by the computer server 105, by, for example, running a non-interrupted monitoring during the entire execution time period of the virtual appliance. Alternatively, the computer server 105 may receive data from the administrator indicative of the monitoring time period and the N time intervals.

A collection of time-dependent values for each of the one or more parameters may be performed by the computer server 105 during the monitoring time period. The computer server 105 may store said time dependent-values in the meta-database 141.

Further, for each parameter of the one or more parameters, the computer server 105 may derive a metric value from the time-dependent values of the given parameter. For example, the metric value may be equal to the average of the time-dependent values. Alternatively, the metric value may be calculated as a weighted sum of the time dependent values ($V_n$):

$$\text{metric value} = \frac{1}{N} \sum_{n=0}^{N} V_n(t_n) \cdot W_n,$$

where $W_n$ are predetermined weights. For example, the weight corresponding to a night time interval may be equal to 1. A higher weight may be associated with other time intervals.

Next, for each parameter of the one or more parameters, the computer server 105 may evaluate the derived metric value. The evaluation may be based on a set of constraints. For example, the set of constraints are determined based on a service level agreement (SLA), wherein the SLA comprises at least one service level objective, SLO, wherein the at least one SLO comprises a condition specification identifying the constraints. The data indicative of the set of constraints are stored in a SLA Registry (SLAR) 145 of the cloud provider 101. The constraints may comprise, for example, the CPU usage of the virtual appliance is within a preset CPU usage range and/or the amount of disk used by the virtual appliance is within a predefined range of disk space usage. In this case, the computer server 105 may check whether the CPU usage of the virtual appliance is within the preset range.

In case that at least one metric value is violating at least part of the constraints, the computer server 105 may determine a second set of resources to be allocated to the virtual appliance and determine a second set of virtual machines for deploying the virtual appliance. The two second sets may satisfy the constraints.

For example, in case the CPU usage of the virtual appliance is below the lower limit of the preset range, the computer server may associate only one virtual machine e.g. 109.2 to the application tier instead of two virtual machines 109.2 and 109.3. The second set of virtual machines may thus contain the three virtual machines 109.1, 109.2 and 109.3. The physical CPU 231.3 that was assigned to the virtual machine 109.3 may then be removed from the first set of resources, resulting in the second set of resources. The computer server 105 may also reduce the number of CPU 231.2 associated with the virtual machine 109.2.

If in addition, the amount of disk used by the virtual appliance is smaller than the lower limit of the of disk space usage, the computer server 105 may reduce the number of disks 233.4 associated with the virtual machine 109.4. The second set of resources may then comprise lower number of CPUs and disks.

The computer server 105, may then deploy the virtual appliance on the second set of the virtual machines; and allocate the second set of resources to the virtual appliance for running the virtual appliance. This may be done automatically. Alternatively, the computer server 105 may prompt data indicative of the two sets to the administrator for evaluation by the administrator, and then performing the allocation and deployments after receiving a request from the administrator.

In another example, the computer server 105 may also determine second set of virtual machines and deploy the virtual appliance on the second set of virtual machines in accordance with a second deployment graph being stored in the meta-database 141.

During deployment of the virtual appliance on the second set of virtual machines, the first set of VMs may not be accessed by the users. The deployment may be performed by migrating the configuration data of the VM 109.3 to the VM 109.2, and execute the portion of the instructions that was executed in the VM 109.3 in the VM 109.2. After that, the users may have access to the second set of virtual machines.

The computer server 105, may update the deployment graph in accordance with the second set of virtual machines and store the updated deployment graph in the meta-database 141.

Figure 2:
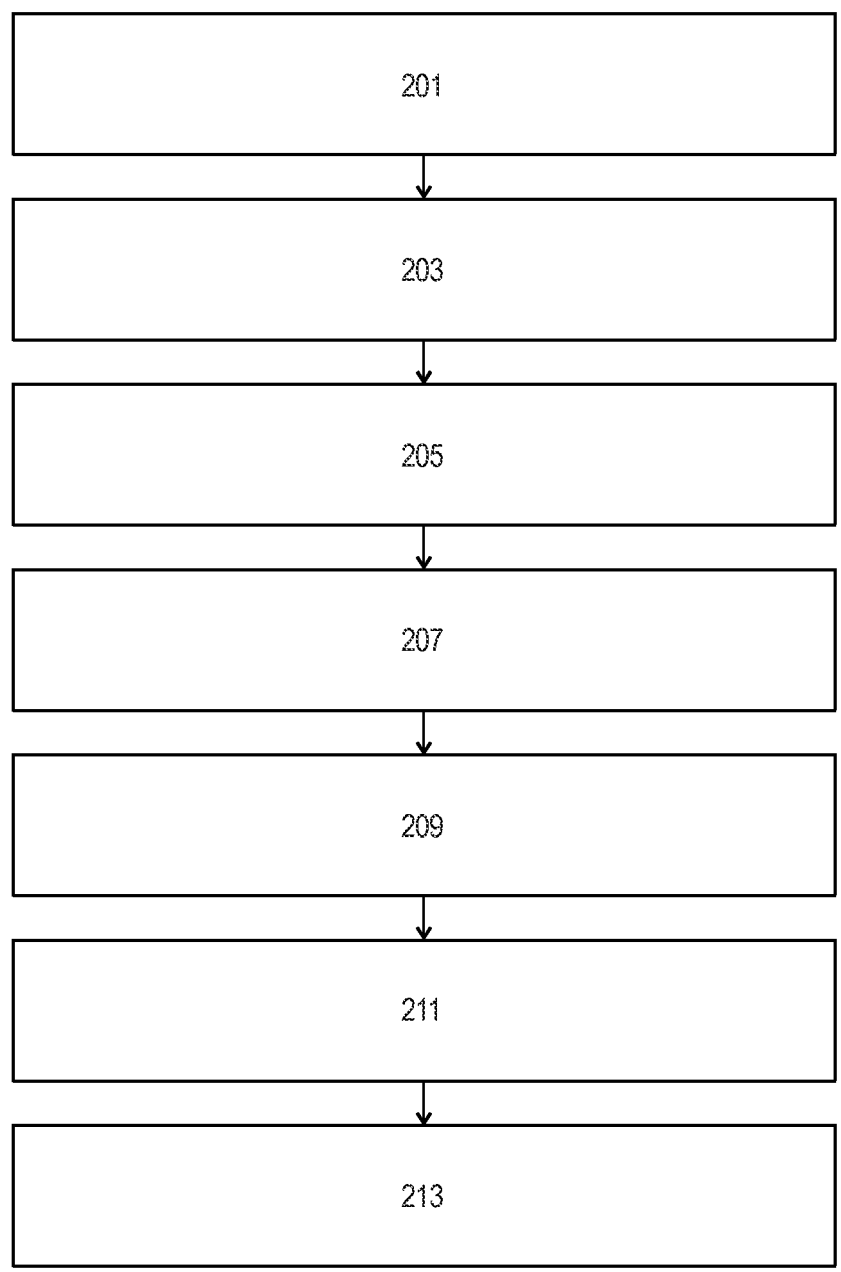
FIG. 2 is a flowchart of a method for running a virtual appliance.

FIG. 2 is a flowchart of a method for running a virtual appliance in a distributed computing system. The virtual appliance comprises an application and a reduced operating system configured to support the application. The virtual appliance is deployed in a first set of virtual machines, wherein a first set of resources of the distributed computing system is allocated to the virtual appliance.

In step 201, a monitoring time period is determined. In step 203, constraints on the operation of the virtual appliance are determined In step 205, during the monitoring time period, one or more predefined parameters indicative of respective one or more operating characteristics of the virtual appliance are monitored while running the virtual appliance. In step 207, time dependent values of the one or more predefined parameters are collected during the monitoring time period. In step 209, for each of at least part of the one or more predefined parameters a metric value is derived from the time-dependent values of the parameter and evaluated based on the constraints.

In step 211, in response to a determination that at least one metric value is violating at least part of the constraints, a second set of resources to be allocated to the virtual appliance and a second set of virtual machines for deploying the virtual appliance are determined. The two sets satisfy the constraints.

In step 213 the virtual appliance is deployed on the second set of the virtual machines and the second set of resources is allocated to the virtual appliance for running the virtual appliance.

It is an objective of embodiments of the invention to provide for an improved computer-implemented method for running a virtual appliance, a computer system and a computer program product. Said objective is solved by the subject matter of the independent claims. Advantageous embodiments are described in the dependent claims.

In one aspect, the present invention relates to a computer implemented method for running a virtual appliance in a distributed computing system, the virtual appliance comprises an application and a reduced operating system configured to support the application, the virtual appliance being deployed in a first set of virtual machines, wherein a first set of resources of the distributed computing system is allocated to the virtual appliance. The method comprises determining a monitoring time period; determining constraints on the operation of the virtual appliance; monitoring, during the monitoring time period, one or more predefined parameters indicative of respective one or more operating characteristics of the virtual appliance while running. The one or more predefined parameters may comprise, for example, CPU utilization, memory usage, network traffic, and number of connected users.

The method further comprises collecting time dependent values of the one or more predefined parameters during the monitoring time period. For example, the collecting may be performed by collecting the time dependent values at equal time intervals of the monitoring time period. In another example, the collecting may be performed by collecting the time dependent values at predefined time intervals of the monitoring time period. In case the monitoring time period is a working day, the collecting may be performed outside lunch break time period, for example.

The collecting further comprises storing the time dependent values in a library of the distributed computing system.

The method further comprises for each of at least part of the one or more predefined parameters: deriving a metric value from the time-dependent values of the parameter; evaluating the metric value based on the constraints; in response to a determination that at least one metric value is violating at least part of the constraints, determining a second set of resources to be allocated to the virtual appliance and determining a second set of virtual machines for deploying the virtual appliance satisfying the constraints; deploying the virtual appliance on the second set of the virtual machines; and allocating the second set of resources to the virtual appliance for running the virtual appliance.

These features may be advantageous, as they may provide an efficient method for dynamically managing the resources allocated to the virtual appliance and the virtual machines (VM) deployed for the virtual appliance. This may avoid an eventual congestion in the distributed computing system and/or underutilization of the allocated resources, and thus, minimizing of resource consumption and freeing up resources.

Another advantage may be that a new allocation and deployment may be performed while satisfying the determined constraints.

According to one embodiment, the deriving of the metric value comprises calculating the average and maximum value of the parameter using the time-dependent values; setting the metric value to 2× average value minus the maximum value. This may be advantageous as it may provide a reliable parameter value taking into account parameter value errors that may occur when collecting the parameter values.

According to one embodiment, the metric value is equal to the average value.

According to one embodiment, the metric value is equal to the maximum value.

According to one embodiment, the deriving of the metric value comprises producing a mathematical function representing the behavior of the variation of the time dependent values; using the mathematical function to determine the metric value. For example, in case of a Gaussian behavior of the time dependent values, the metric value may be equal to the sum of the Gaussian mean and 3 standard deviations of the Gaussian. This may be advantageous as it may provide a safe parameter value taking into account the errors by adding the standard deviations.

According to one embodiment, the method comprises:
Dividing the monitoring time period into N time intervals,
Collecting one or more parameter values at each time interval of the N time intervals, resulting in the time dependent values;
For each parameter of the one or more predefined parameters, calculating the metric value as a weighted sum of the time dependent values, wherein the weights are determined in accordance with respective time intervals. For example, during a working day, the monitoring time period may be divided into three time periods: morning, afternoon and lunch break time intervals. Higher weights may be assigned to the afternoon and morning time intervals and a lowest weight may be assigned to the lunch break time interval. This may take into account the fact that the usage of the resources of the distributed computing system during effective working time may increase in a feature time in contrast to the usage of resources during the lunch break time which is not a frequent action.

According to one embodiment, the second set of resources is determined by selecting a set of resources satisfying the constraints from a predetermined plurality of resource sets being stored in the distributed computing system. This may be advantageous as it may provide an optimal set of resources.

According to one embodiment, the determining the second set of resources comprises: determining a group of resource sets that satisfy the constraints; assigning to each of the group of resource sets a ranking value; sorting by ranking value the group of resource sets; and selecting from the group of resource sets the second set of resources as the set having the highest ranking value. The ranking value may be for example the inverse number of CPU that satisfies the constraints, and the second set of resources being selected has the lowest number of CPUs. This may be advantageous as it may provide the best resource combination that may run the virtual appliance while still satisfying the constraints.

According to one embodiment, the determining of the second set of VMs comprises: determining a group of VM sets that satisfy the constraints; assigning to each of the group of VM sets a second ranking value; sorting by second ranking value the group of VM sets; and selecting from the group of VM sets the second set of VMs as the set having the highest ranking value.

According to one embodiment, the deploying of the second set of resources to the virtual appliance and allocating of the second set of resources is automatically performed. This may be advantageous as it may not require external interventions to update the resources, and may thus solve any issue in time.

According to one embodiment, the method further comprises prompting data indicative of the second set of resources and the second set of virtual machines to an administrator of the distributed computing system to enter request data; receiving the request data via an interface from the administrator; allocating the second set of resources to the virtual appliance and deploying the second set of resources to the virtual appliance based on the request data. This may be advantageous, in case the system may require inputs from the administrator that may help to decide on how to proceed for the deployment and allocation.

According to one embodiment, the first set of resources comprises the second set of resources in addition to a subset of resources, wherein the allocating the second set of resources comprises de-allocating the subset of resources to the virtual appliance. This may be advantageous, as it may avoid an underutilization of the allocated resources and thus saving the additional subset of resources.

According to one embodiment, the second set of resources comprises at least part of the first set of resources. For example, in case of a high load caused by the application of the virtual appliance the second set of resources may contain more resources than in the first set such that it may avoid the high load by allocating more resources to the virtual appliance.

According to one embodiment, the first set of virtual machines is represented by a deployment graph comprising virtual machines of the first set joined by edges indicatives of relationships between those virtual machines, wherein the virtual appliance is deployed in the first set of virtual machines based on the deployment graph, wherein the method further comprises updating the deployment graph, determining the second set of virtual machines based on the updated deployment graph, and deploying the virtual appliance on the second set of virtual machines based on the updated deployment graph. The updating may be performed by replacing the deployment graph and/or creating a new deployment graph. This may be advantageous as it may keep track of up-to date deployment graphs.

According to one embodiment, the constraints are determined based on a service level agreement (SLA), wherein the SLA comprises at least one service level objective, SLO, wherein the at least one SLO comprises a condition specification identifying the constraints. This may be advantageous as it may increase the quality of the service provided by the distributed computing system by for example running the virtual appliance with a predefined quality service agreed on with the user of the virtual appliance.

According to one embodiment, the deploying comprises:
prohibiting access by users to the first set of virtual machines;
moving configuration data of the first set of virtual machines to the second virtual machines, for executing the virtual appliance on the second set of virtual machines;
providing access to the second set of virtual machines.

For example, the second set of VMs may be smaller than the first set of VMs, and the VMs of the second set of VMs are part of the set of VMs. In this case, only the configuration data of removed (missing) VMs from the first set are moved to one or more VMs of the second set of VMs. The one or more VMs are selected from the second set of VMs.

In another aspect, the invention relates to a computer program product comprising computer executable instructions to perform the method steps of the method of any one of the preceding embodiments.

In another aspect, the invention relates to a computer system for running a virtual appliance in a distributed computing system, the virtual appliance comprising an application and a reduced operating system configured to support the application, the virtual appliance being deployed in a first set of virtual machines, wherein a first set of resources of the distributed computing system is allocated to the virtual appliance, the computer system being adapted for:
determining a monitoring time period;
determining constraints on the operation of the virtual appliance;
monitoring, during the monitoring time period, one or more predefined parameters indicative of respective one or more operating characteristics of the virtual appliance while running;
collecting time dependent values of the one or more predefined parameters during the monitoring time period;
for each of at least part of the one or more predefined parameters:
deriving a metric value from the time-dependent values of the parameter;
evaluating the metric value based on the constraints;
in response to a determination that at least one metric value is violating at least part of the constraints, determining a second set of resources to be allocated to the virtual appliance and determining a second set of virtual machines for deploying the virtual appliance satisfying the constraints;
deploying the virtual appliance on the second set of the virtual machines; and
allocating the second set of resources to the virtual appliance for running the virtual appliance.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
running a virtual appliance in a distributed computing system, the virtual appliance comprising an application and a reduced operating system configured to support the application, the virtual appliance being deployed in a first set of virtual machines, wherein a first set of resources of the distributed computing system is allocated to the virtual appliance;
determining constraints on an operation of the virtual appliance with respect to a first operating characteristic;
monitoring the first operating characteristic of the virtual appliance to collect a plurality of time-dependent values relating to a first parameter associated with the first operating characteristic;
calculating a first metric value from the plurality of time dependent values by calculating an average value and a maximum value of said first parameter using the time-dependent values, and setting the first metric value to twice the average value minus the maximum value;
determining whether the running of the virtual appliance is violating the constraints based on the first metric value;
in response to a determination that the running of the virtual appliance is violating the constraints, allocating a second set of resources of the distributed computing system to the virtual appliance, wherein the second set of resources is different than the first set of resources;
deploying a second set of virtual machines for the virtual appliance; and
continuing to run the virtual appliance using the second set of resources and the second set of virtual machines.

2. The method according to claim 1, further comprising:
producing a mathematical function representing a behavior of a variation of the time-dependent values; and
using the mathematical function to determine the first metric value.

3. The method according to claim 1, wherein the second set of resources is determined by selecting a set of resources satisfying the constraints from a predetermined plurality of resource sets being stored in the distributed computing system.

4. The method according to claim 1, further comprising:
determining a group of resource sets that satisfy the constraints;
assigning to each of the group of resource sets a ranking value, sorting by ranking value the group of resource sets; and
selecting from the group of resource sets the second set of resources as the set having a highest ranking value.

5. The method according to claim 1, wherein deploying the virtual appliance on the second set of the virtual machines and allocating the second set of resources to the virtual appliance for running the virtual appliance is automatically performed.

6. The method according to claim 1, further comprising:
prompting data indicative of the second set of resources and the second set of virtual machines to an administrator of the distributed computing system to enter request data;
receiving the request data via an interface from the administrator;
allocating the second set of resources to the virtual appliance and deploying the second set of resources to the virtual appliance based on the request data.

7. The method according to claim 1, wherein the first set of resources comprises the second set of resources in addition to a subset of resources, wherein said allocating the second set of resources comprises de-allocating the subset of resources to the virtual appliance.

8. The method according to claim 1, wherein the second set of resources comprises at least part of the first set of resources.

9. The method according to claim 1, wherein the first set of virtual machines is represented by a deployment graph comprising virtual machines of the first set joined by edges indicative of relationships between said virtual machines, wherein the virtual appliance is deployed in the first set of virtual machines based on the deployment graph, and wherein the method further comprises:
updating the deployment graph;
determining the second set of virtual machines based on the updated deployment graph; and
deploying the virtual appliance on the second set of virtual machines based on the updated deployment graph.

10. The method according to claim 1, wherein the constraints are determined based on a service level agreement (SLA), wherein the SLA comprises at least one service level objective (SLO), wherein the at least one SLO comprises a condition specification identifying the constraints.

11. A computer program product one or more non-transitory computer readable storage mediums and program instructions stored on at least one of the one or more non-transitory storage mediums, the stored program instructions comprising:
program instructions to run a virtual appliance in a distributed computing system, the virtual appliance comprising an application and a reduced operating system configured to support the application, the virtual appliance being deployed in a first set of virtual machines, wherein a first set of resources of the distributed computing system is allocated to the virtual appliance;
program instructions to determine constraints on an operation of the virtual appliance with respect to a first operating characteristic;
program instructions to monitor the first operating characteristic of the virtual appliance to collect a plurality of time-dependent values relating to a first parameter associated with the first operating characteristic;
program instructions to calculate a first metric value from the plurality of time dependent values by calculating an average value and a maximum value of said first parameter using the time-dependent values, and setting the first metric value to twice the average value minus the maximum value;
program instructions to determine whether the running of the virtual appliance is violating the constraints based on the first metric value;
program instructions to, in response to a determination that the running of the virtual appliance is violating the constraints, allocate a second set of resources of the distributed computing system to the virtual appliance, wherein the second set of resources is different than the first set of resources;
program instructions to, deploy a second set of virtual machines for the virtual appliance; and
program instructions to continue to run the virtual appliance using the second set of resources and the second set of virtual machines.

12. The computer program product of claim 11, further comprising:
program instructions to produce a mathematical function representing a behavior of a variation of the time-dependent values; and
program instructions to use using the mathematical function to determine the first metric value.

13. The method of claim 1, further comprising:
program instructions to calculate the first metric value as a weighted sum of time dependent values (Vn), such that:

first metric value=$1/N\Sigma_{n=0}^{N} V_n(t_n) \cdot W_n$ where $W_n$ are predetermined weights and $t_n$ are time intervals in the monitoring time period.

14. The method of claim 1, wherein the application is a multi-tier architecture application that includes a presentation tier, an application tier that implements application processing, and a back-end database tier for data management and wherein the method further comprises:
deploying a first virtual machine to execute the presentation tier;
deploying a second virtual machine to execute the application tier; and
deploying a third virtual machine to execute the back-end database tier.

15. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to run a virtual appliance in a distributed computing system, the virtual appliance comprising an application and a reduced operating system configured to support the application, the virtual appliance being deployed in a first set of virtual machines, wherein a first set of resources of the distributed computing system is allocated to the virtual appliance;

program instructions to determine constraints on an operation of the virtual appliance with respect to a first operating characteristic;

program instructions to monitor the first operating characteristic of the virtual appliance to collect a plurality of time-dependent values relating to a first parameter associated with the first operating characteristic;

program instructions to calculate a first metric value from the plurality of time dependent values by calculating an average value and a maximum value of said first parameter using the time-dependent values, and setting the first metric value to twice the average value minus the maximum value;

program instructions to determine whether the running of the virtual appliance is violating the constraints based on the first metric value;

program instructions to, in response to a determination that the running of the virtual appliance is violating the constraints, allocate a second set of resources of the distributed computing system to the virtual appliance, wherein the second set of resources is different than the first set of resources;

program instructions to, deploy a second set of virtual machines for the virtual appliance; and program instructions to continue to run the virtual appliance using the second set of resources and the second set of virtual machines.

16. The method of claim 1 wherein the first set of resources are physical devices.

17. The computer system of claim 15, further comprising:

program instructions to produce a mathematical function representing a behavior of a variation of the time-dependent values; and program instructions to use the mathematical function to determine the first metric value.

18. The computer system of claim 15, wherein the second set of resources is determined by selecting a set of resources satisfying the constraints from a predetermined plurality of resource sets being stored in the distributed computing system.

* * * * *